May 19, 1959  R. T. CORNELIUS  2,887,059
WABBLE PUMPS

Filed Aug. 17, 1954  16 Sheets-Sheet 1

INVENTOR
RICHARD T. CORNELIUS

Caswell & Lagaard
ATTORNEYS

INVENTOR
RICHARD T. CORNELIUS
Caswell & Lagaard
ATTORNEYS

INVENTOR
RICHARD T. CORNELIUS
Caswell & Lagaard
ATTORNEYS

May 19, 1959 R. T. CORNELIUS 2,887,059
WABBLE PUMPS
Filed Aug. 17, 1954 16 Sheets-Sheet 13

INVENTOR
RICHARD T. CORNELIUS
Caswell & Lagaard
ATTORNEYS

May 19, 1959   R. T. CORNELIUS   2,887,059
WABBLE PUMPS
Filed Aug. 17, 1954   16 Sheets-Sheet 15

INVENTOR
RICHARD T. CORNELIUS
Caswell & Lagaard
ATTORNEYS

May 19, 1959  R. T. CORNELIUS  2,887,059
WABBLE PUMPS

Filed Aug. 17, 1954  16 Sheets-Sheet 16

INVENTOR
RICHARD T. CORNELIUS

Caswell & Lagaard
ATTORNEYS

United States Patent Office 2,887,059
Patented May 19, 1959

2,887,059
WABBLE PUMPS

Richard T. Cornelius, Minneapolis, Minn.

Application August 17, 1954, Serial No. 450,457

25 Claims. (Cl. 103—5)

The herein disclosed invention relates to wabble pumps and has for an object to reduce the pulsation occurring when the line of contact between the wabble plate and the surface which it contacts reaches the notch in the wabble plate through which the partition extends.

Another object of the invention resides in providing a wabble pump in which loss of pressure in the pump is reduced and in which the efficiency is increased.

A still further object of the invention resides in utilizing two pump units connected in series and having their own notched wabble plates and driven in unison so that the lines of contact of the two wabble plates with the surfaces which they contact do not both register with the notches in the wabble plates at the same time.

An object of the invention resides in arranging the pump units so at least one of them prevents reverse flow of fluid from the other unit.

Another object of the invention resides in making the two pump units coaxial and driving both at the same speed and in arranging the relation between the rotors and stators of the two pump units so that the lines of contact of the wabble plates do not both register with the notches in the wabble plates at the same time.

An object of the invention resides in mounting both rotors and stators in the same housing.

A still further object of the invention resides in one form of the invention in utilizing an electric motor for operating the pump units and in mounting the rotors of the pump units on opposite ends of the armature shaft.

An object of the invention resides in another form of the invention in arranging the units coaxially and in simultaneously driving both units from a common source of power.

Another object of the invention resides in several forms of the invention in utilizing a common rotor for both units.

Another object of the invention resides in other forms of the invention in utilizing one rotor for both pump units.

A feature of the invention resides in one form of the invention in arranging the pump units concentric and spaced longitudinally.

Another object of the invention resides in one form of the invention in arranging the pump units concentric and with an inner pump unit and an outer pump unit encircling the inner pump unit.

Other objects of the invention reside in the novel combination and arrangment of parts and in the details of construction hereinafter illustrated and/or described.

In the drawings:

Fig. 6 is a fragmentary elevational sectional view similar to Fig. 2 and of a portion of the structure shown therein and drawn to a greater scale.

Figure 1:
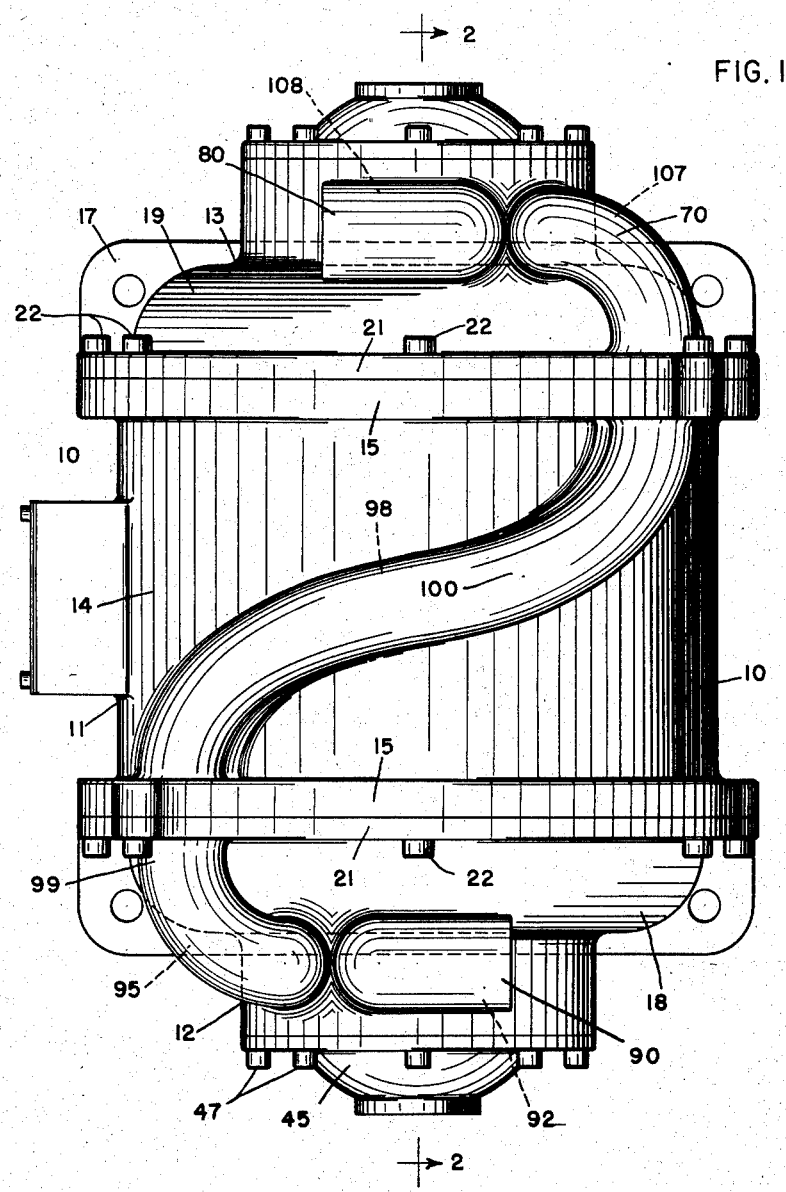
Fig. 1 is a plan view of one form of the invention.

The construction shown in the drawings consists of two nutating pump units of equal capacity simultaneously driven at the same rate of speed from a common source of power. Each pump unit utilizes a case having oppositely facing frusto-conical surfaces and cooperating therewith is a wabble plate issuing from a wabble head mounted on a wabble shaft which is driven to maintain contact between the wabble plates and the coacting frusto-conical surfaces of the case. Extending across the case from one frusto-conical surface to the other is a partition which divides the space between the frusto-conical surfaces of the case into inlet and outlet chambers. The outlet chamber of one unit is connected to the inlet chamber of the other unit so that the units are connected in series. A notch in each wabble plate receives the partition of the unit with which it is associated. The parts are so arranged that the lines of contact of the wabble plates of the two units with the frusto-conical surfaces with which they cooperate do not register with the notches of the two units at the same time so that leakage past the wabble plate of one pump unit at the time of register is always blocked by the other unit.

The invention shown in Figs. 1 to 6 includes a housing 10 in which is mounted a motor 11 driving two wabble plate pump units 12 and 13. These parts will now be described in detail.

The housing 10 consists of a cylindrical shell 14 in which the motor 11 is disposed having issuing outwardly therefrom flanges 15 and 16. Attached to said flanges and to the shell proper is a base 17 on which the pump rests. Secured to the flanges 15 and 16 are two end bells 18 and 19 and in which the two pump units 12 and 13 are mounted. The end bells 18 and 19 have flanges 21 which are secured to the flanges 15 and 16 by means of screws 22.

The motor 11 is of the split phase type and consists of an armature 23 which comprises a shaft 24 of relatively large diameter. The ends of this shaft serve as drive shafts for the units 12 and 13. The shaft 24 is journaled in ball bearings 25 and 26 carried by the end bells 18 and 19. Mounted on the shaft 24 is a revolving core 27 of the squirrel-cage type and which is provided with the usual cage 28 ordinarily employed with such types of motors. Two fans 29 mounted on the shaft 23 adjacent the core 27 provides circulation of air through the motor and also over portions of the two pumps 12 and 13. These fans draw air through inlets 16 in end bells 18 and 19 and discharge the air through outlets 20 in the shell 14. The motor 11 also uses a stationary toothed core 31 which is attached to lugs 32 formed on the shell 14 by means of screws 33. This core has mounted in the slots of the same windings 34 which are constructed in the usual manner and which serve to energize the motor.

The two pump units 12 and 13 are identical in construction except for the porting and driving of the same, and only the pump unit 12 will be described in detail. Pump unit 12 consists of a case 35 best shown in Fig. 5. This case is received in a bore 36 formed in the end bell 18. An annular inwardly extending projection 37 in the end bell 18 covers the end of the ball bearing 25 and provides a radial face 38 at the end of the bore 36. The case 35 consists of two inserts 41 and 42 which fit snugly within the bore 36 and which are joined together at their facing surfaces as designated at 43 in the drawing. A plate 44 is disposed between the insert 42 and the surface 38. All of these parts are clamped together by means of a cap 45 which overlies the end 46 of the bell 18 and is secured thereto by means of screws 47. To prevent leakage, O-ring seals 48 are employed which are disposed between the plate 44 and the surface 38 of end bell 18 and between the cap 45 and the bore 36 of said end bell. A dowel pin 51 acting between the insert 42 and the end bell 18 prevents rotation of the said insert relative to the housing proper.

The insert 42 is constructed with a frusto-conical surface 52, the apex of which lies along the axis of the shaft 24. The insert 41 is similarly constructed with a frusto-conical surface 53, the apex of which lies likewise along the axis of shaft 24. The surfaces 52 and 53 are disposed in spaced diverging relation and are connected together at their bases by means of a spherical surface 54 which has its center 56 disposed along the axis of the shaft 23 and at a locality midway between the apexes of the two surfaces 52 and 53. The insert 42 has a spherical surface 55 whose center similarly coincides with the center 56. Insert 41 likewise has a spherical surface 57 lying in continuation of the surface 55 of insert 42 and whose center coincides with the center 56. The center 56 is the center of nutation of the pump as will be hereinafter more fully described.

Formed at the ends of the shaft 24 are bores 58 and 59. These bores are angularly disposed with reference to the axis of said shaft and form an obtuse angle with reference to one another. The axes of the bores and the axis of said shaft lie in a common plane and intersect one another at the center of the motor 11. Mounted in the bore 58 are two ball bearings 61 and 62 which rotatably support a wabble shaft 63. Shaft 63 has a head 64 which engages the inner race of bearing 61. The outer race of this bearing butts up against a shoulder 65 formed at the end of the bore 58. Spacers 65 and 66 hold the two bearings 61 and 62 in position and a clamp ring 67 screwed into the end of the shaft 24 holds the bearings 61 and 62 and the shaft 63 in position.

Figure 4:
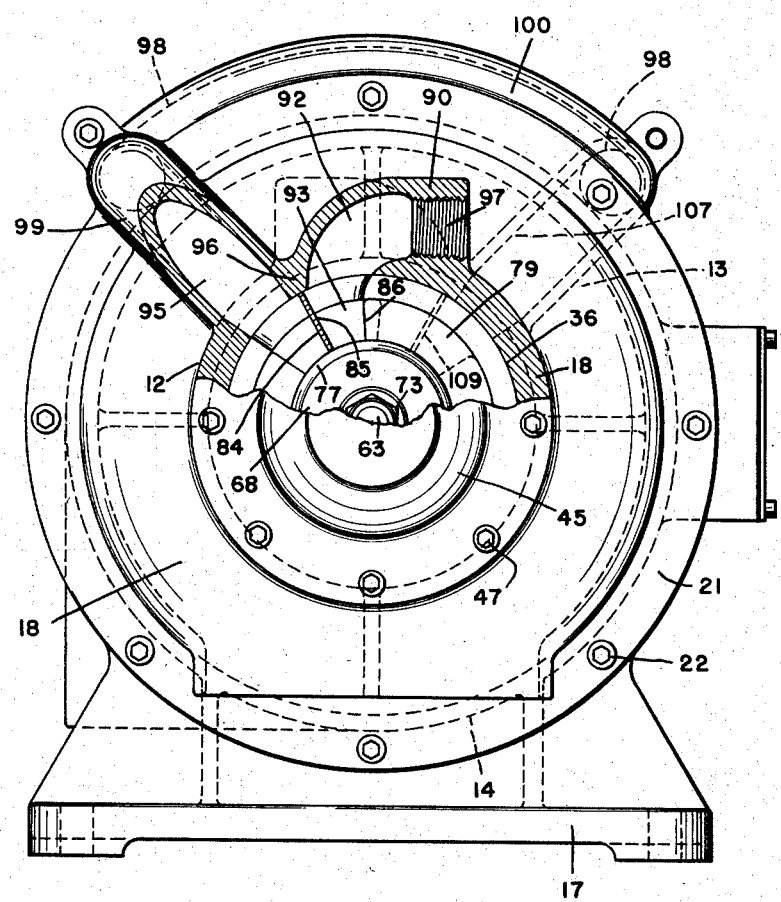
Fig. 4 is an end elevational view taken from the other end and with parts broken away to show the passageways of the pump.
Figure 5:
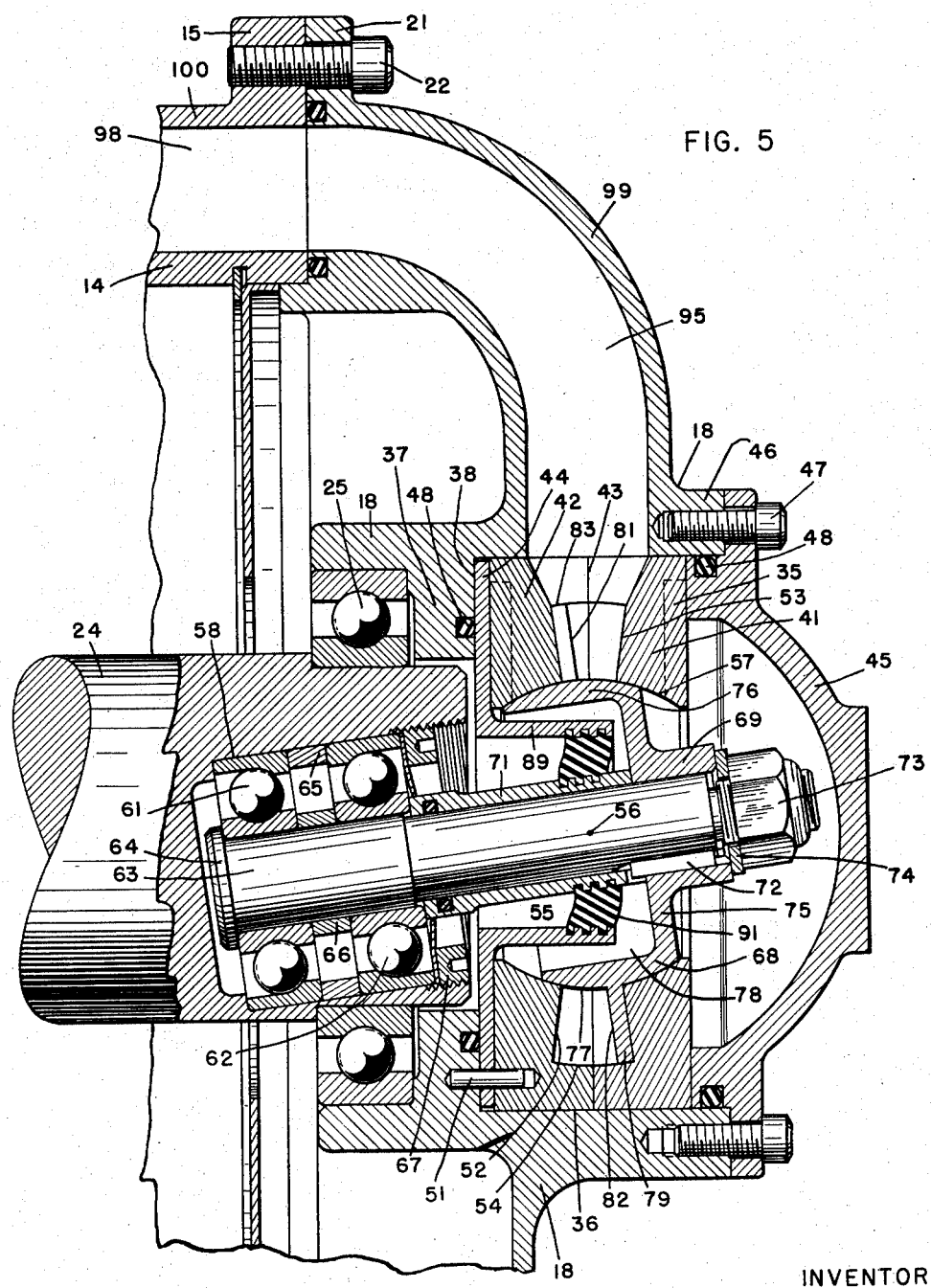
Fig. 5 is a fragmentary elevational sectional view similar to Fig. 2 showing the construction of the rotor and drawn to a greater scale.

Mounted on the shaft 63 is a wabble head 68 which is constructed with a hub 69 disposed on said shaft. Said hub engages a sleeve 71 encircling the shaft 63 and butting up against the inner race of the bearing 62. The hub 69 is keyed to shaft 63 by means of a key 72 and the parts are clamped in position by means of a nut 73 screwed on the extreme end of said shaft. A lock washer 74 disposed between said nut and the hub 69 holds the parts from relative movement. Issuing outwardly from the hub 69 is a web 75 which has connected to the outer end of the same a tubular member 76. This tubular member has a spherical surface 77 conforming to the surfaces 55 and 57 of the case 35 and whose center coincides with the center 56. The said web and tubular member provide a pocket 78 within the wabble head 68 and which serves a purpose to be presently described in detail. Issuing outwardly from the tubular member 76 at the center of the same is an annular disc-like plate 79 which will be referred to as the wabble plate. This plate has two surfaces 81 and 82 which are frusto-conical in form and whose axes coincide with the axis of the shaft 63 and which are longitudinally equally spaced from the wabble center 56. The surface 81 is adapted to lie in close proximity to the surface 53 of case 35 while the surface 82 is adapted to lie in close proximity to the surface 52 of said case. In addition, the end 83 of plate 79 conforms to and lies in close proximity to the spherical surface 54 of case 35. In the drawings, the surfaces of the wabble head 68 is shown as contacting the corresponding surfaces of the case 35. It will, however, be readily comprehended that any desired clearance may be adopted and the parts constructed without making a physical contact. The upper portion of the case 35, as best shown in Figs. 4 and 6, is provided with a partition 84 which is received in slots 85 in the inserts 41 and 42. This partition extends through a notch 86 in the wabble plate 79 and down to the spherical surface 77 of the head 68. The inner end of the partition has a surface corresponding with the bore 36 of the end bell 18 and is urged against the same. Ears 87 formed on the upper sides of said partition are received in recesses 88 in the inserts 41 and 42 and hold the partition in proper position.

Disposed between the shaft 63 and the bell 18 of housing 10 is an annular flexible seal 91. This seal is in the form of a relatively heavy disc of rubber or some other similar material and has its inner edge integrally connected to the sleeve 71 and its outer edge integrally connected to a sleeve 89 on the plate 44. This latter sleeve extends into the pocket 78. Seal 91 is so situated that the center of the medial plane thereof lies substantially at the wabble center 56.

The end bell 18 is constructed with a duct structure 90 having an inlet passageway 92 therein which communicates with the chamber 93 within the case 35 and on one side of the partition 84. The said end bell is further provided with a duct structure 99 having an outlet passageway 95 communicating with chamber 93 on the other side of partition 84. A portion of the case between the passageways 92 and 95, indicated by the reference numeral 96, engages the partition 84 and separates the ends of the chamber 93 and passageways 92 and 95. The duct structure 90 of the end bell 18, forming the inlet passageway 92, is provided with threads 97 and to which the source of fluid being pumped may be connected.

Figure 2:
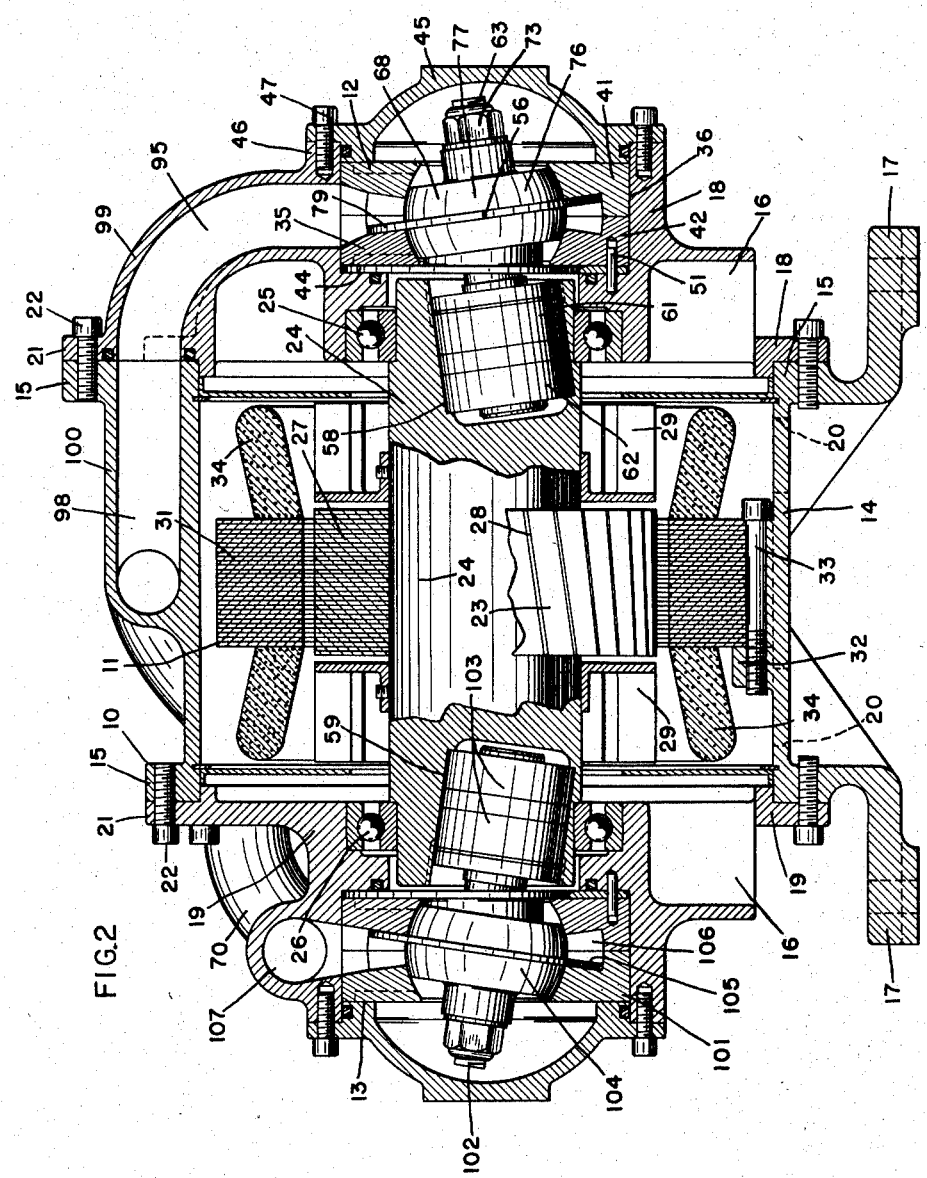
Fig. 2 is an elevational sectional view taken substantially on line 2—2 of Fig. 1.
Figure 3:
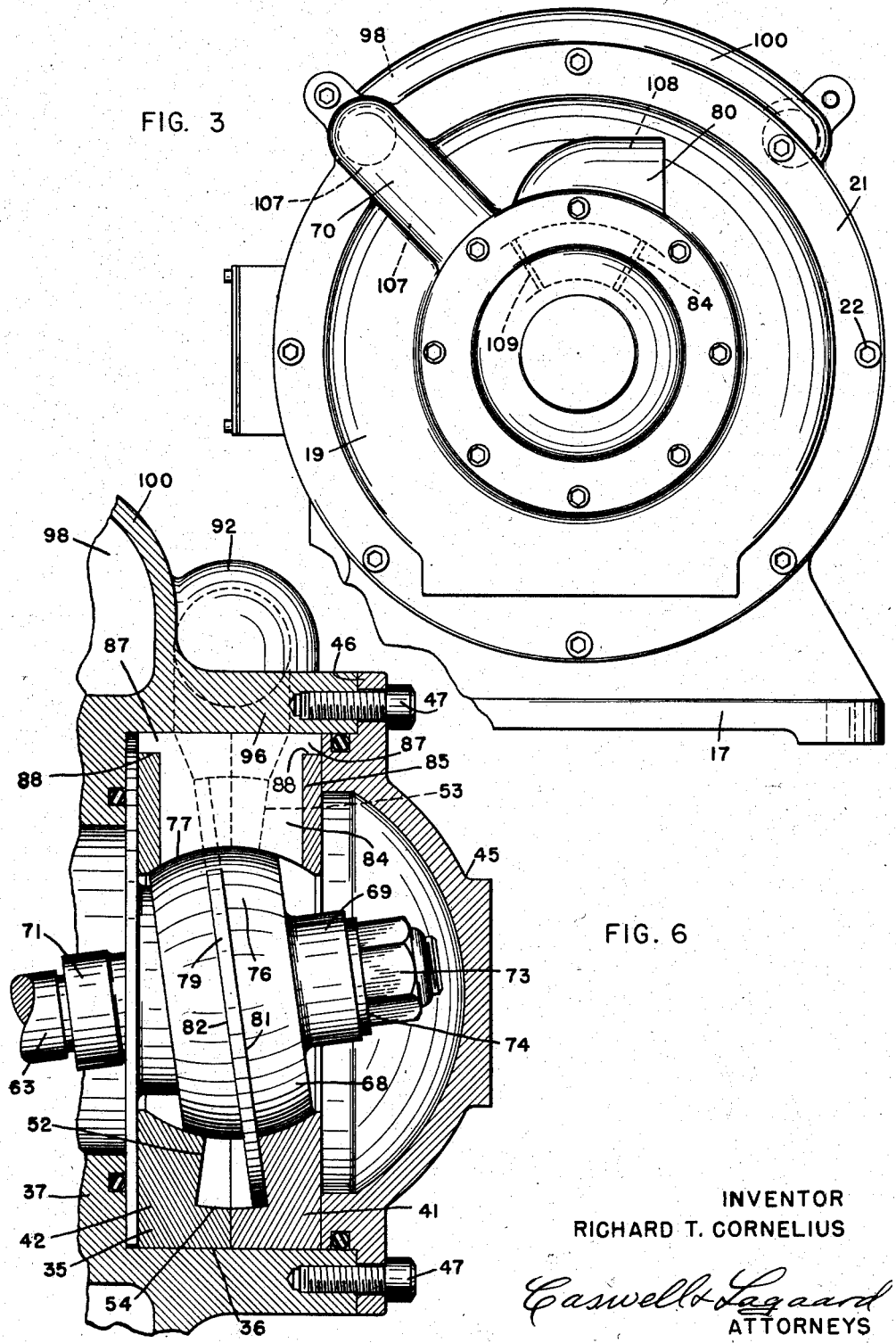
Fig. 3 is an end elevational view of the structure shown in Fig. 1.

The wabble plate unit 13 shown in Figs. 2 and 3 is similarly constructed to the unit 12. This unit has a case 101 mounted in the end bell 19. A wabble shaft 102, similarly constructed to the shaft 63, is rotatably supported in bearings 103 mounted in the bore 59 of shaft 24. Shaft 102 carries a wabble head 104 which has a wabble plate 105 operating in an annular chamber 106 in the case 101. The end bell 19 is constructed with a duct structure 70 having an inlet passageway 107 and a duct structure 80 having an outlet passageway 108 disposed on opposite sides of the partition 109 of said unit. As will be noted in Fig. 4, the partitions 85 and 109 are equally disposed on opposite sides of a vertical plane passing through the axis of shaft 24 and are circumferentially spaced about sixty degrees apart. Cast on the shell 14 is a duct structure 100 forming a connecting passageway 98 which communicates with the outlet passageway 95 of the unit 12 and the inlet passageway 107 of the unit 13. By means of this construction, the two units are connected in series, the fluid pumped by the unit 12 being delivered to the unit 13 which in turn delivers the fluid to the outlet passageway 108 of said unit 13.

The construction shown in Figs. 1 to 6 operates as follows:

Upon rotation of the motor shaft 24 by energization of the windings 34 of motor 11 the wabble shafts 63 and 102 are caused to nutate. This causes the two wabble plates 79 and 105 to operate in the customary manner and to draw fluid from the inlet passageways thereof and to discharge the same through the outlet passageways of said units. The fluid enters the inlet passageway 92 of pump unit 12, is directed through the pump unit and leaves by the passageway 95. This passageway communicating with passageway 98 leads the fluid to the inlet passageway 107 of the pump unit 13. The fluid on passing through this pump unit leaves through the outlet passageway 108. Due to the fact that the partitions 85 and 109 are spaced circumferentially from one another and due to the fact that the axes of the shafts 102 and 63 lie in a radial plane containing the axis of the shaft 24, wabble plate 79 of unit 12 is in proximity to the portion of the frusto-conical surfaces 52 and 82 at the locality of the partition 85 at a different time than when the partition 105 is adjacent the portions of the frusto-conical surfaces thereof adjacent the partition 109. In this manner, one of the pump units forms a seal between the inlet and outlet and prevents fluid from the receptacle in which the fluid is pumped from flowing back through the two pumps and into the inlet passageway of the first unit. Thus pulsating of the pump is greatly reduced.

Figure 7:
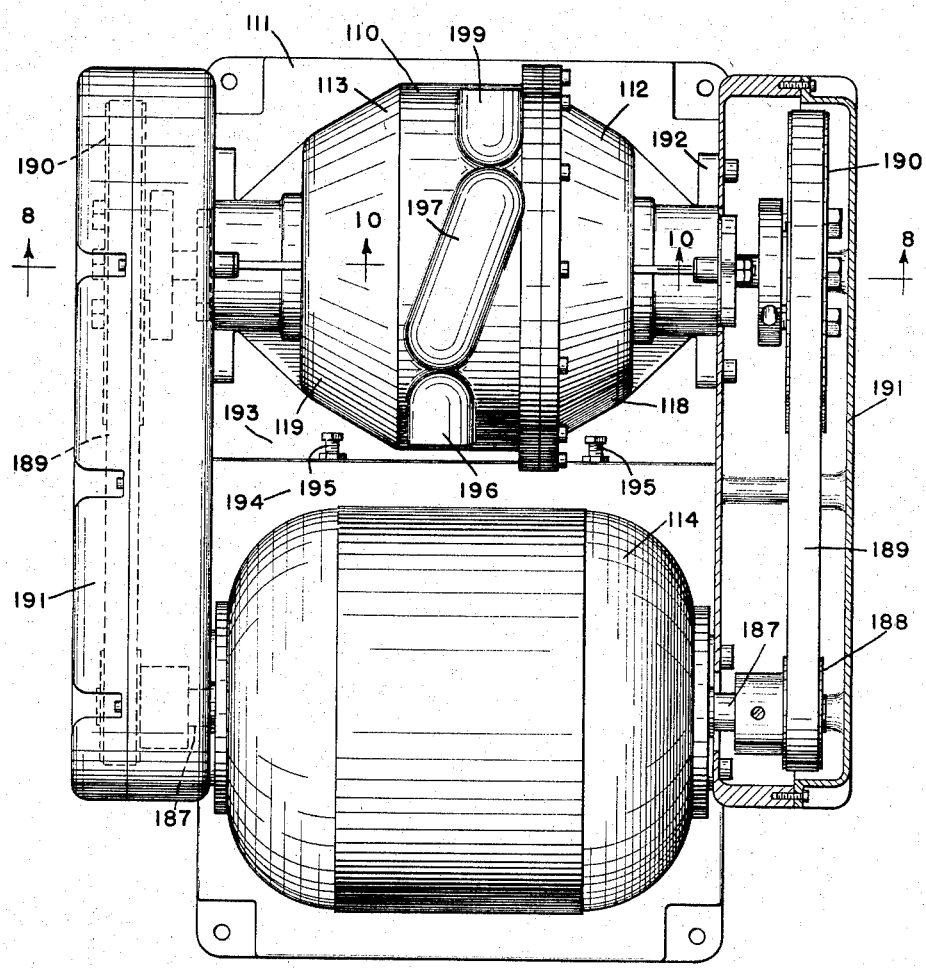
Fig. 7 is a plan view of another form of the invention.
Figure 8:
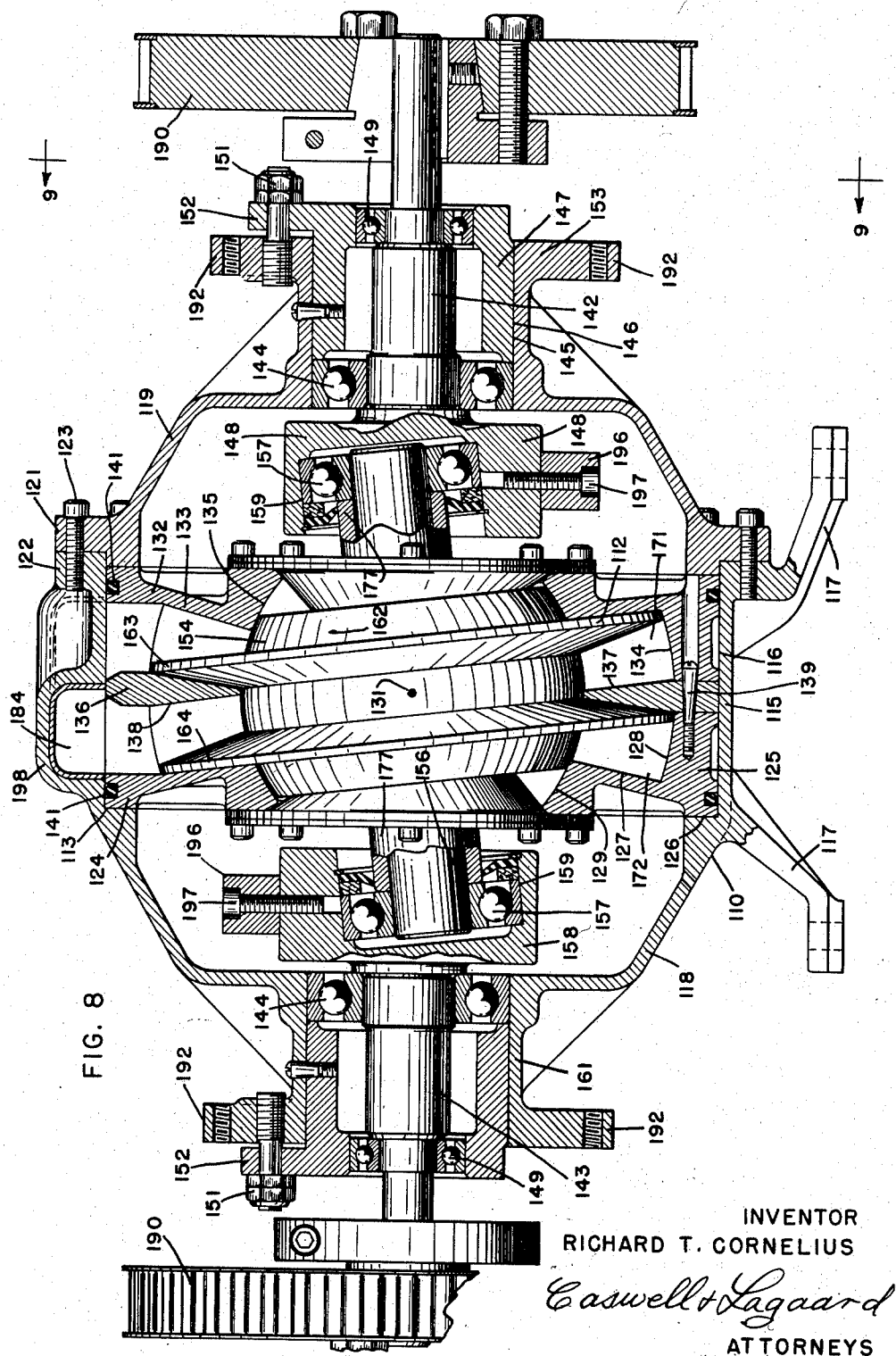
Fig. 8 is an elevational sectional view taken on line 8—8 of Fig. 7.
Figure 9:
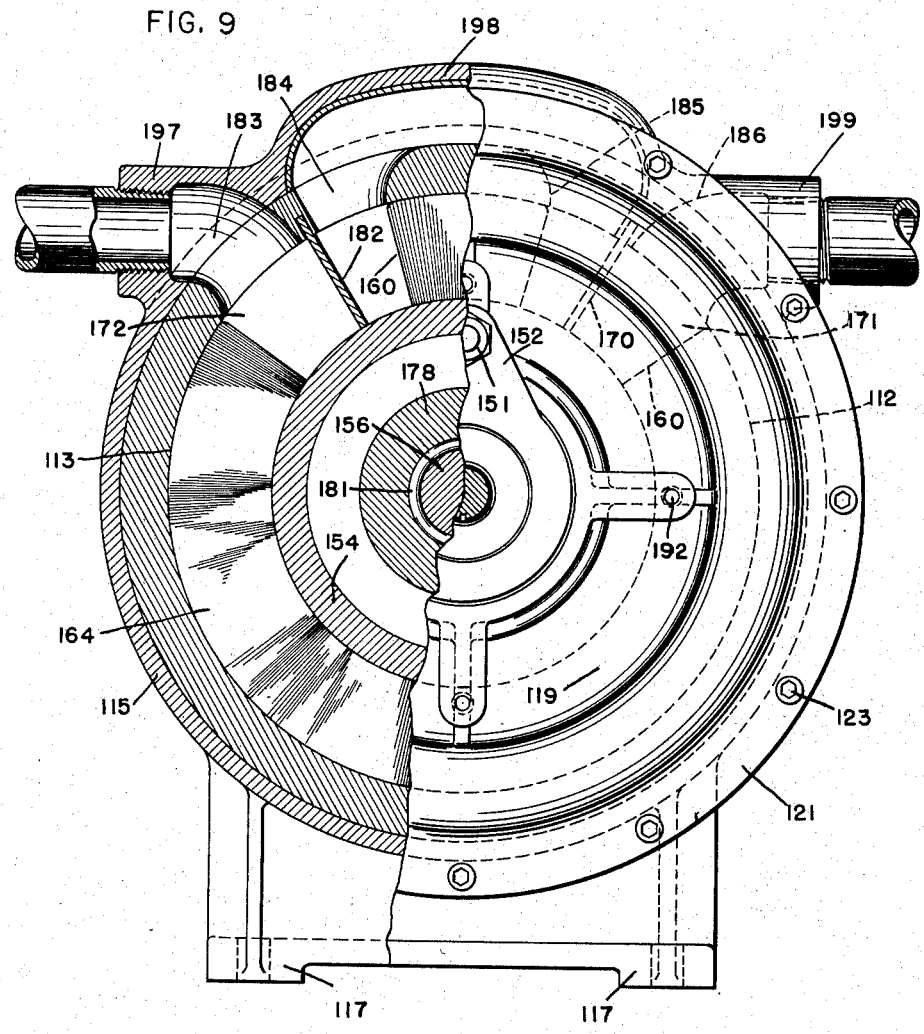
Fig. 9 is a cross-sectional view taken substantially on line 9—9 of Fig. 8 and with portions broken away to show the inlet and outlet passageways of one of the pump units.

The invention illustrated in Figs. 7, 8 and 9 includes a housing 110 mounted on a base 111. In the housing is arranged two pump units 112 and 113 which are driven from an electric motor 114, also mounted on the base 111.

The housing 110, as best shown in Fig. 8, consists of a cylindrical shell 115 formed with a bore 116 therein. Legs 117 extend downwardly from the shell 115 and by means of which the housing may be attached to the base 111. Issuing outwardly from one side of the shell 115 is an end bell 118 which carries portions of the rotating parts of the pump unit 113. At the other side of said housing is a detachable end bell 119 which similarly supports certain of the rotating parts of the pump unit 112. The end bell 119 is formed with a flange 121 which overlies the end of the shell 115 and is secured to a flange 122 formed thereon by means of screws 123.

The two pump units 112 and 113 are formed as a composite structure and utilizes a single case 124 which is received in the bore 116 of shell 115. This case includes an insert 125 which butts up against a shoulder 126 formed on the end bell 118. This insert has a frusto-conical surface 127 which faces outwardly from the shoulder 126. Said insert also has an outer spherical surface 128 and an inner spherical surface 129 which are concentric and which have a common center 131 lying in the axis of the bore 116. Also disposed in the bore 116 is a second insert 132 which has a frusto-conical surface 133 and two spherical surfaces 134 and 135 which lie in continuation of the surfaces 128 and 129 and which have the same center as the center 131 of said first named surfaces. Between the two inserts 125 and 132 is disposed an annular divider 136. This divider has oppositely facing frusto-conical surfaces 137 and 138 which face the surfaces 133 and 127. The apexes of all of the frusto-conical surfaces lie in the axis of the bore 116 and are equally spaced on opposite sides of the center 131. The inserts 125 and 132 and the divider 136 are clamped together by means of screws 139 which extend through the insert 132 and the divider 136 and are threaded into the insert 125. O-rings 141 imbedded into the inserts and engaging the wall of the shell 115 at the bore 116 form a fluid-tight connection between the case 124 and the housing 110. By means of this construction, the case 124 is formed with two juxtaposed annular chambers 171 and 172.

The two pump units 112 and 113 are driven by means of two drive shafts 142 and 143. The drive shaft 142 is mounted for rotation in a ball bearing 144 received in a bore 145 formed in a hub 146 issuing outwardly from the end bell 119. A sleeve 147 mounted for adjustable sliding movement in the bore 145 engages the outer race of the ball bearing 144 and urges the same inwardly. The inner race of this ball bearing engages a head 148 on the end shaft 142. Sleeve 147 carries another ball bearing 149 which further supports the shaft 142. The sleeve 147 may be moved along the bore 145 by means of an adjusting screw 151 which extends through a lug 152 on the sleeve 147 and is threaded into a flange 153 on the hub 146. The shaft 143 is coaxial with the shaft 142 and is similarly mounted in a hub 161 formed on the end bell 118. This shaft has a head 158 similar to the head 148.

Figure 10:
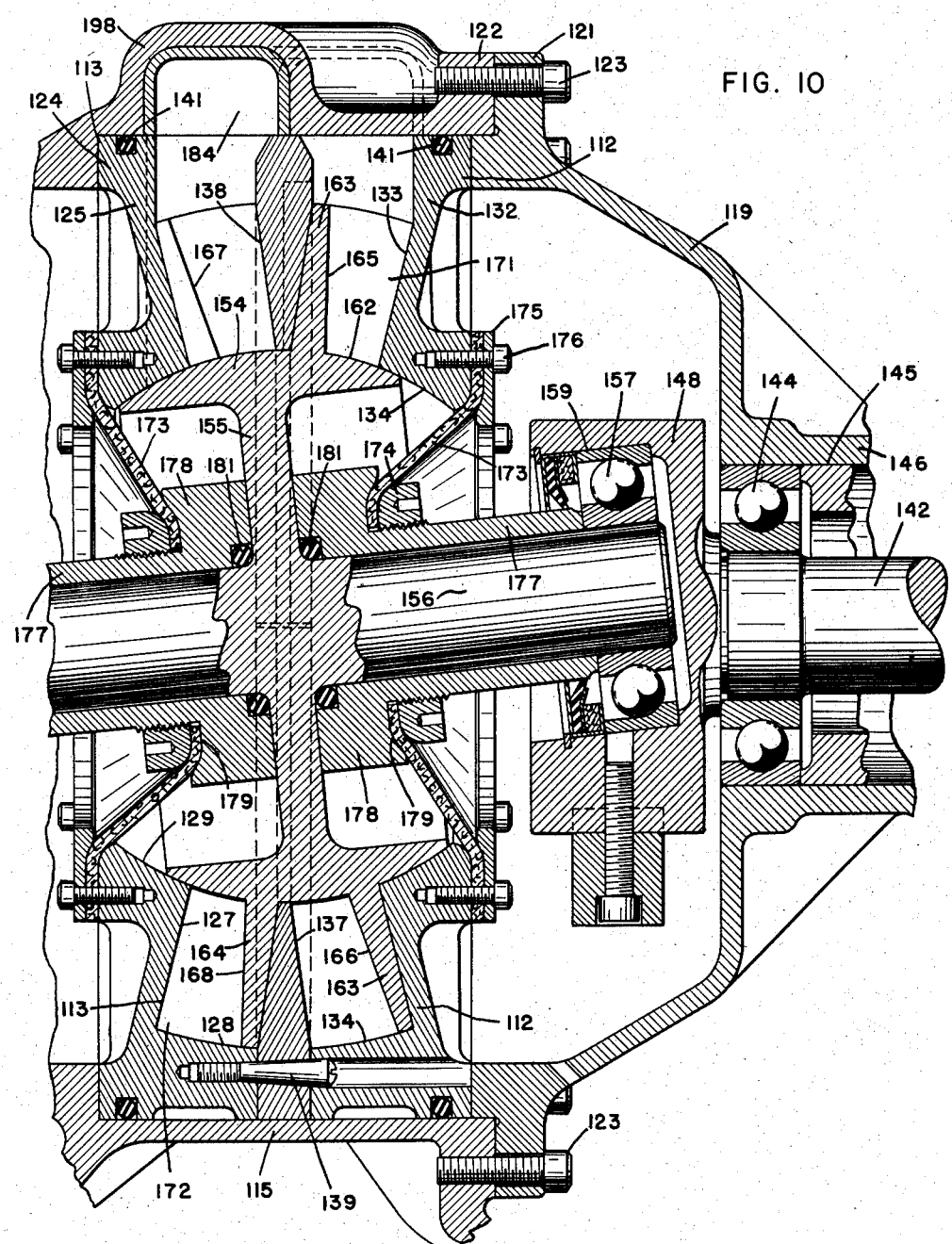
Fig. 10 is a fragmentary elevational sectional view of the pump units taken substantially on line 10—10 of Fig. 7 and drawn to a greater scale.
Figure 11:
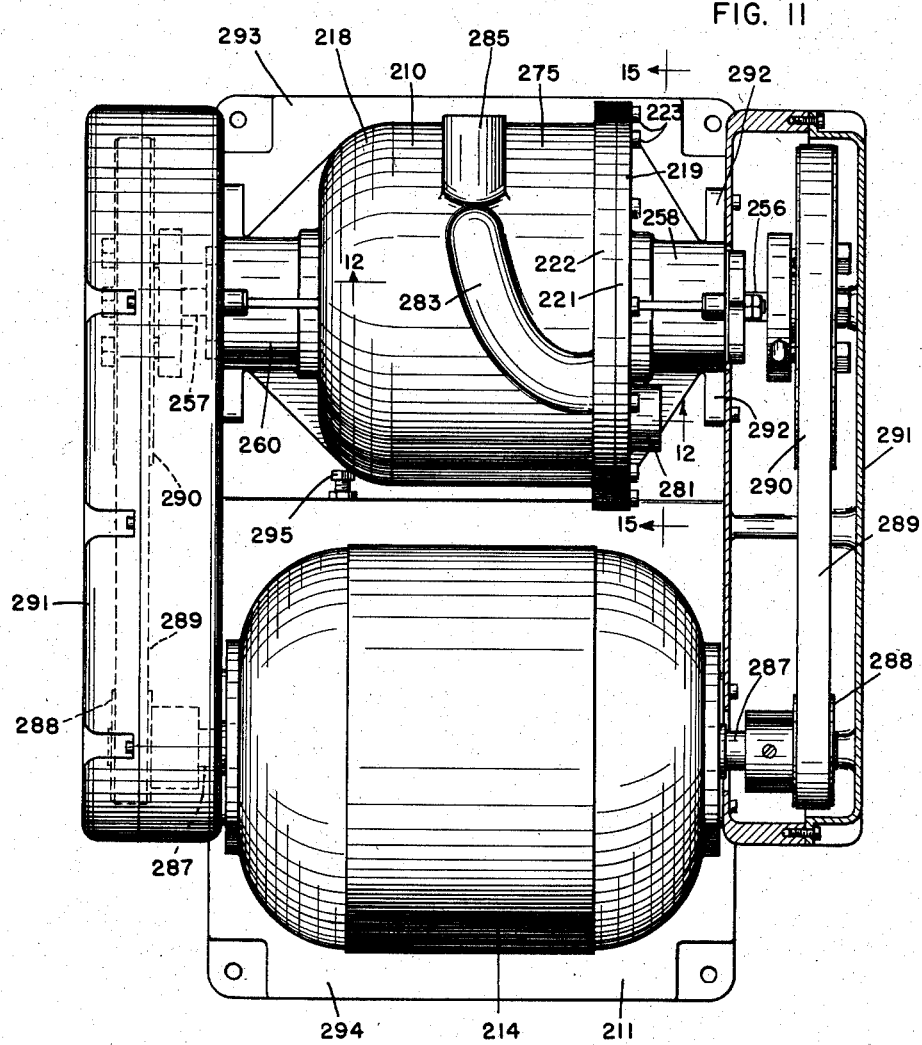
Fig. 11 is a plan view of another form of the invention.

The two pump units 112 and 113 have a common wabble head 154, best shown in Fig. 10, which is attached intermediate its ends to a web 155 issuing outwardly from a wabble shaft 156. This shaft is mounted in ball bearings 157 carried by the head 148 on shaft 142 and the corresponding head 158 on shaft 143. The bearings 157 are received in bores 159 angularly disposed in said heads, and the axis of the shaft 156 forms an angle with the axes of the shafts 142 and 143 and intersects said axes at the center 131 and lies in a plane containing said axes. The head 154 of the pump units 112 and 113 has a spherical surface 162 which lies in close proximity to the surfaces 129 and 134 of the case 124. Issuing outwardly from the surface 162 are formed on the head 154 two annular wabble plates 163 and 164. These wabble plates have frusto-conical surfaces 165, 166, 167 and 168 which are adapted to engage the frusto-conical surfaces 133, 137, 138 and 127 of the case 124. The wabble plate 163 is disposed in chamber 171 while the wabble plate 164 is disposed in chamber 172. The ends of the wabble plates 163 and 164 engage the spherical surfaces 134 and 128 of the case 124.

Disposed between the head 154 of the wabble plate units 112 and 113 and case 124 are two flexible seals 173. These seals are constructed from sheet material, cup-shaped in form, and are clamped to the inserts 125 and 132 by means of clamp rings 175 which encircle the outer margins of said seals and are attached to the said inserts by means of screws 176. For attaching the inner ends of said seals to the head 154 the following construction is employed: Mounted on the shaft 156 are sleeves 177 which are formed with flanges 178 extending ouawardly therefrom and forming shoulders 179. The inner ends of the seals 173 are clamped against the shoulders 179 by means of nuts 174 which are threaded on the sleeves 177. O-rings 181 form a fluid-tight connection between the sleeves 177 and the head 154. The ends of the sleeves 177 butt against the inner races of the bearings 157 and hold the parts in properly assembled position. Counter balances 196 attached to the heads 158 of shafts 142 and 143 by means of screws 197 make the pump run smoother.

Extending across the chamber 172 of the pump unit 113, as best shown in Fig. 9, is a partition 182. Similarly extending across the chamber 171 of pump unit 112 is another partition 170. The annular wabble plates 163 and 164 are formed with notches 160 which receive the partitions 170 and 172. The shell 115 is constructed with a duct structure 197 having an inlet passageway 183 which communicates with the chamber 172 on one side of the partition 182. The said shell is also constructed with a duct structure 198 having an outlet passageway 184 on the other side of said partition which communicates with an inlet passageway 185 communicating with the chamber 171 on one side of the partition 170. The said shell is also constructed with a duct structure 199 having an outlet passageway 186 which communicates with the chamber 171 on the other side of the partition 170.

The motor 114 is formed with shaft extensions 187 at both ends of the same. Mounted on these extensions are sheaves 188 which are toothed to drive two-gear belts 189. These gear belts pass over two sheaves 190 which are carried by the shafts 142 and 143. Guards 191 secured to arms 192 formed on the end bells 118 and 119 protect the transmission between the motor 114 and the pump units 112 and 113. The base 111 is made in two sections 193 and 194 connected together with screws 195 which may be adjusted to spread the sections apart to tighten the belts 189.

The invention illustrated in Figs. 11, 12, 13, 14 and 15 includes a housing 210 mounted on a base 211. In the housing is arranged two pump units 212 and 213 which are driven from an electric motor 214, also mounted on base 211.

Figure 12:
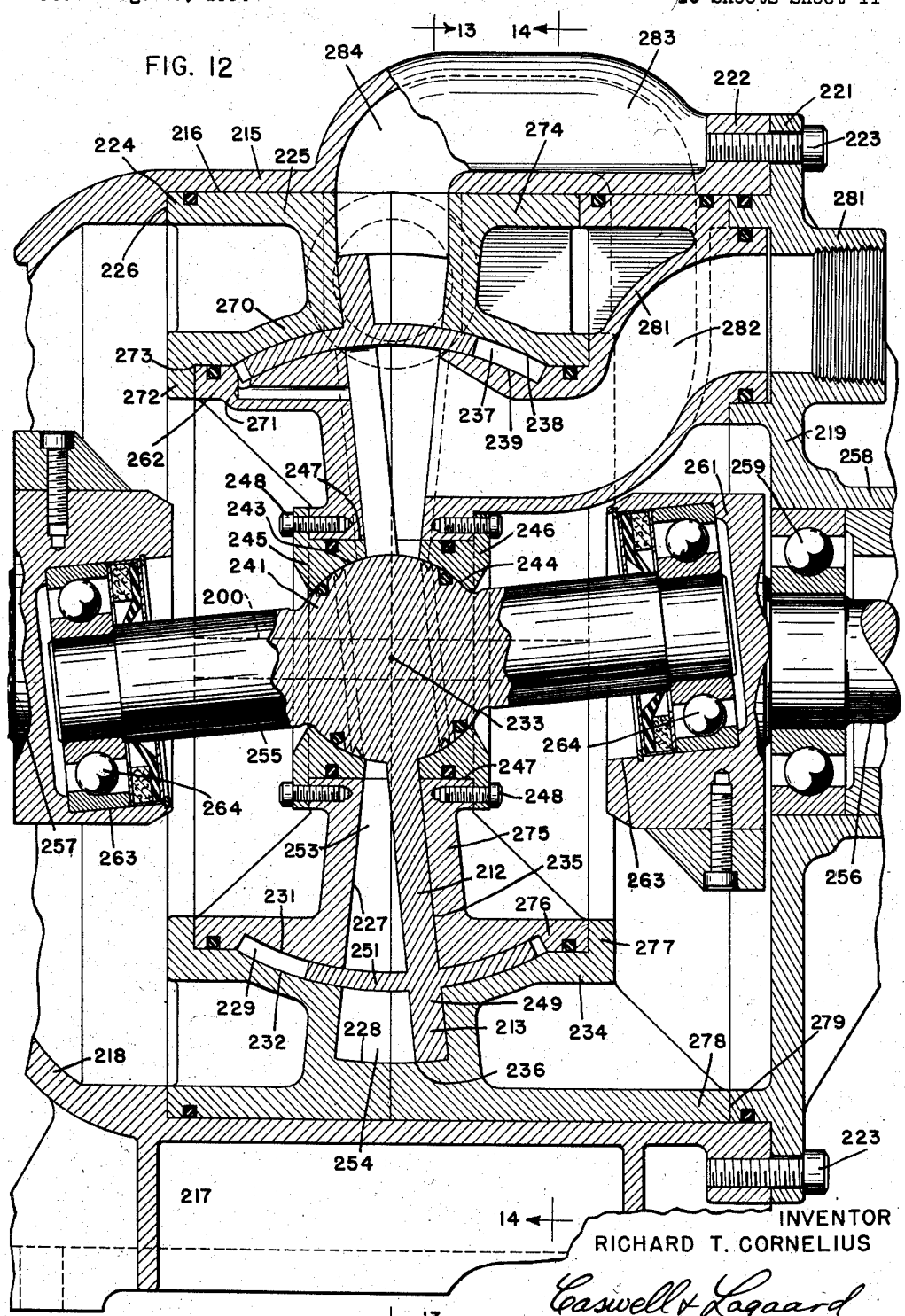
Fig. 12 is a fragmentary longitudinal elevational sectional view taken substantially on line 12—12 of Fig. 11 and drawn to a greater scale.
Figure 13:
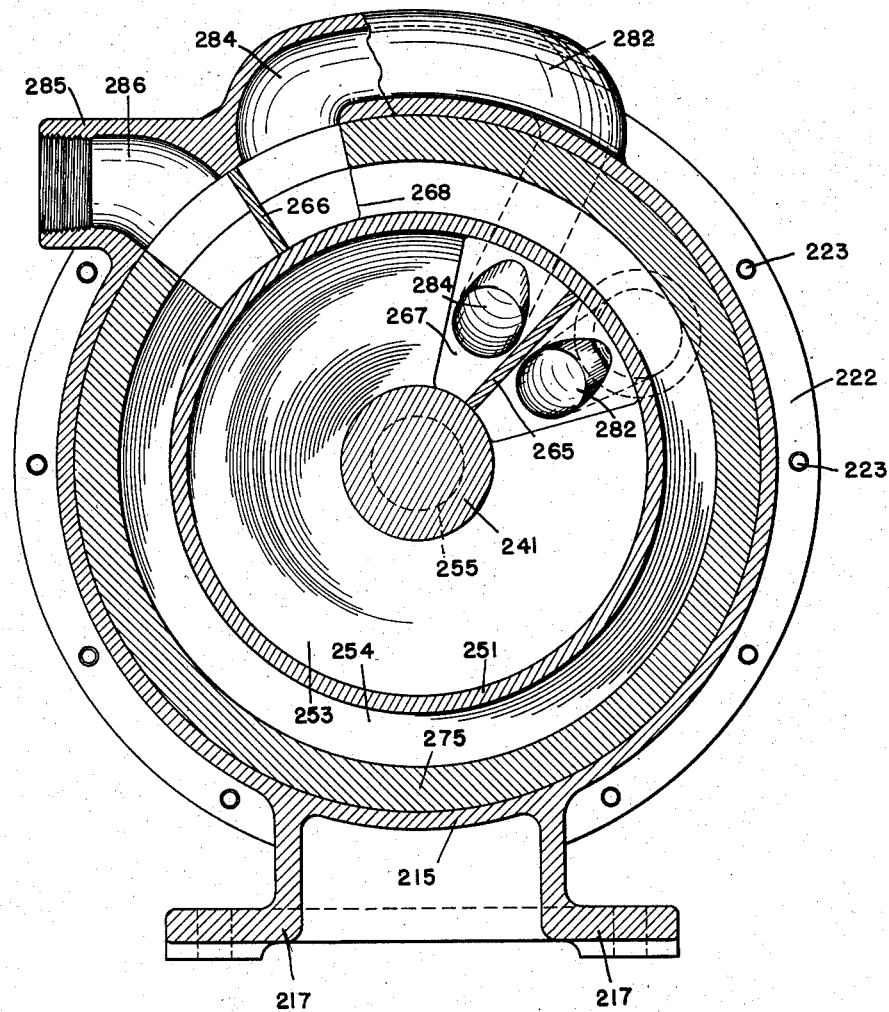
Fig. 13 is a cross-sectional view taken substantially on line 13—13 of Fig. 12 and drawn to a slightly smaller scale.
Figure 14:
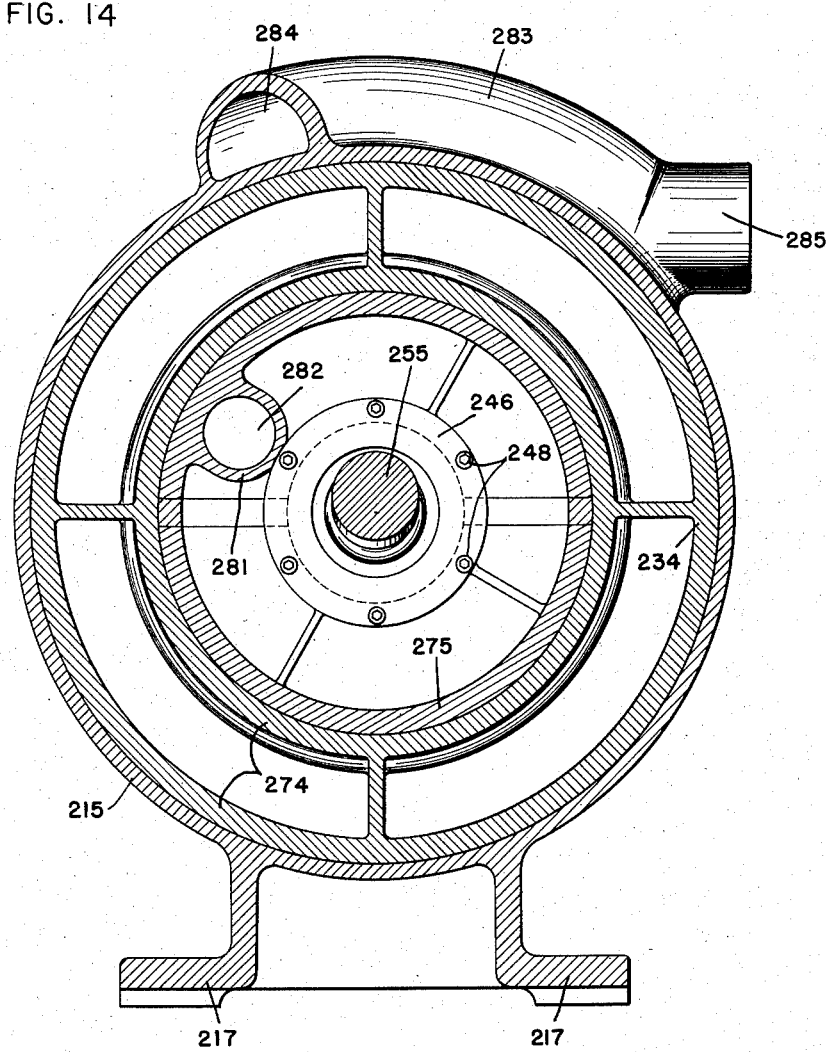
Fig. 14 is a cross-sectional view taken on line 14—14 of Fig. 12 and drawn to the same scale as Fig. 13.
Figure 15:
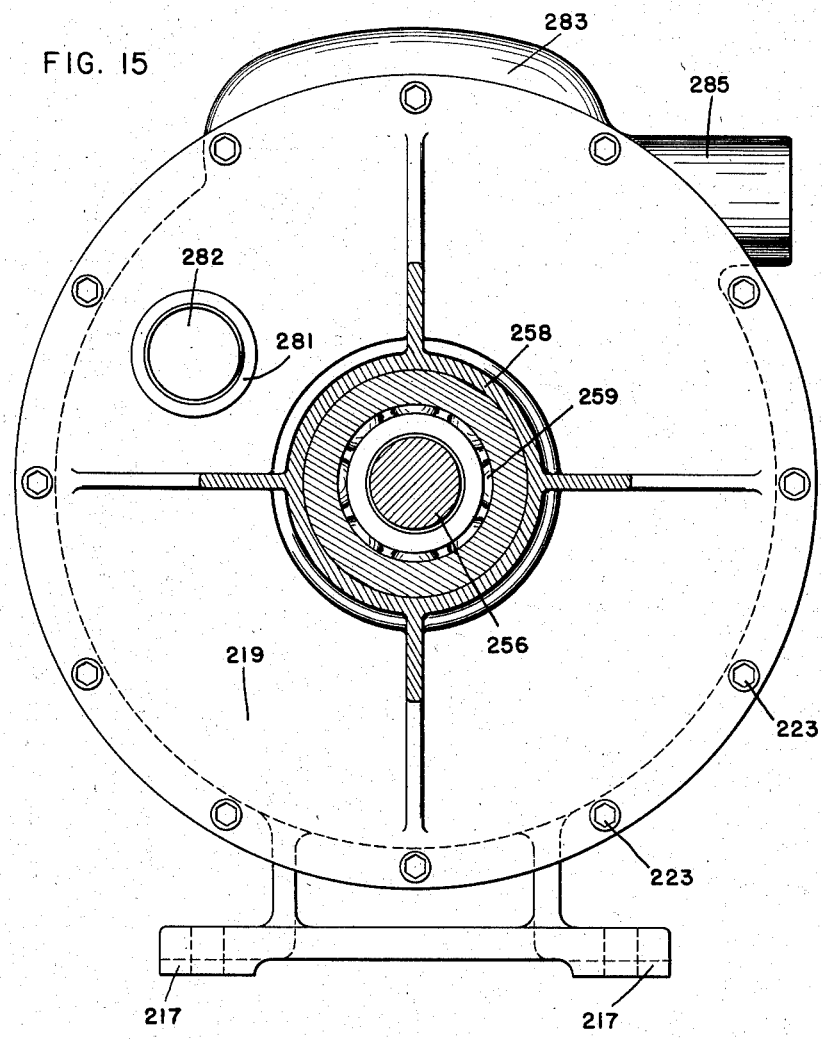
Fig. 15 is a cross-sectional view similar to Figs. 13 and 14 and taken on line 15—15 of Fig. 11.

The housing 210, as best shown in Fig. 12, consists of a cylindrical shell 215 having a bore 216 therein. Legs 217 extend downwardly from the shell 215 and by means of which the housing may be attached to the base 211. Issuing outwardly from one side of the shell 215 and integral therewith is an end bell 218 which carries portions of the rotating parts of the pump. At the other side of the housing is a detachable bell 219 which similarly supports certain of the rotating parts of the pump. The end bell 219 is formed with a flange 221 which overlies the end of the shell 215 and is secured to a flange 222 formed thereon by means of screws 223.

The two pump units 212 and 213 are formed as a composite structure and utilizes a single case 224 which is received in the bore 216 of the shell 215. This case includes an insert 225 which butts up against a shoulder 226 formed on the end bell 218. This insert has a frusto-conical surface 227 which faces outwardly from the shoulder 226. The said insert also has an outer spherical surface 228 and a spherical slot 229 formed in the same providing two spherical surfaces 231 and 232. The surfaces 231 and 232 of said slot and the surface 228 are concentric and have as their center a point 233 located at the axis of the bore 216. Also disposed in the bore 216 is a second insert 234 which has a frusto-conical surface 235 and a spherical surface 236. The surface 236 is at the outer end of the surface 235 and lies in continuation of the surface 228 with its axis at the center 233. The insert 234 is also constructed with a spherical groove 237 which has spherical surfaces 238 and 239, all having centers at the center 233, and which lie in continuation of the surfaces 231 and 232 of the insert 225. To facilitate construction of the slot 229, the insert 225 is constructed in two sections 270 and 271 which are jointed together as best shown in Fig. 12, the section 271 being provided with a rim 272 received in an annular socket 273 formed in the section 270. In a similar manner, the insert 234 is constructed in two sections 274 and 275. The section 274 is provided with a rim 276 which is received in an annular socket 277 in the section 275. The section 270 of insert 225 butts up against the shoulder 226, as previously referred to, while the end 278 of the section 275 of insert 234 butts up against a shoulder 279 formed on the end bell 219. To facilitate assembly, the sections of the inserts 225 and 234 are constructed in halves with filler plates 200 therebetween. When screws 223 are tightened up, all of the parts are clamped together in cooperative operative positions.

The two pump units 212 and 213 have a common wabble head 241 which is spherical in form. This head forms part of a wabble shaft 242 and is received within spherical sockets 243 and 244 formed on two rings 245 and 246 secured to the inserts 225 and 234. These rings are disposed in bores 247 in said insert and attached thereto by means of screws 248. Issuing outwardly from the wabble head 241 is a wabble plate 249 which has attached to it spherical wings 251. These wings are received in the grooves 229 and 237 of inserts 225 and 234 and engage the spherical surfaces 231, 232, 238 and 239 thereof. The extreme end 252 of the plate 249 engages the spherical surfaces 228 and 236 of the inserts 225 and 234. By means of this construction, two annular chambers 253 and 254 are formed, the chamber 253 being the chamber for the pump unit 212 and the chamber 254 being that for the pump unit 213. The inner portion of the wabble plate 249 between the head 241 and the wings 251 serves as the wabble plate for the unit 212 while the portion of said plate outwardly of the wings 251 serves as the wabble plate for the unit 213. These wabble plates operate in the usual manner with the two frusto-conical surfaces 227 and 235 of the inserts 225 and 234.

For the purpose of driving the wabble head 241, two concentric drive shafts 256 and 257 are employed. The drive shaft 256 is rotatably mounted in bearings supported in a boss 258 issuing outwardly from the end bell 219, one of which is illustrated in Fig. 12 and designated by the reference numeral 259. The construction for supporting these drive shafts may be such as illustrated in detail in Fig. 8 with one of the earlier described forms of the invention. The drive shaft 257 is similarly mounted and supported for rotation in a boss 260 issuing outwardly from the end bell 218.

For the purpose of supporting the wabble plate 249 for nutation, the head 241 is formed integral with a wabble shaft 255. This shaft is supported for nutation in the following manner: Formed on the inner ends of these shafts 256 and 257 are enlargements 261 and 262 which are formed with bores 263 which receive bearings 264 mounted therein. The ends of the shaft 255 are received in these bearings. The bores 263 are in alignment and are disposed at an angle with reference to the axes of the shafts 256 and 257 which are coaxially disposed so that the axis of the shaft 255 intersects the axes of the shafts 256 and 257 at the center 233.

In the pump, two partitions 265 and 266 are employed which extend across the chambers 253 and 254 respectively. The partition 265 engages the wabble head 241 and also the inner surfaces of the wings 251. The portion of the plate 249 at which the partition 265 is disposed, is formed with a notch 267 to receive said partition. In a similar manner, the partition 266 engages the outer surfaces of the wings 251 and likewise the surfaces 228 and 236. The portion of the wabble plate 249 outwardly of the wings 251 is formed with a notch 268 to receive said partition. In the end bell 219 and in the section 275 of the insert 234 is a duct 281 having a passageway 282 therein. This passageway serves as an inlet passageway to the pump unit 212 and communicates with the chamber 253 on the right-hand side of the partition 265 as viewed in Fig. 13. Another duct structure 283 formed in the shell 215 and in the case 224 is provided with a passageway 284 which communicates with the chamber 253 on the other side of the partition 265 and with the chamber 254 on one side of the partition 266. Another duct structure 285 formed in the shell 215 and in the case 224 has a passageway 286 extending through it and which communicates with the chamber 254 on the other side of the partition 266. This passageway forms an outlet from the pump unit 213 and conducts the fluid from the pump.

The motor 214 is formed with shaft extensions 287 at both ends of the same. Mounted on these extensions are sheaves 288 which are toothed to drive two-gear belts 289. These gear belts pass over two sheaves 290 which are carried by the shafts 256 and 257. Guards 291 secured to arms 292 formed on the end bells 218 and 219 protect the transmission between the motor 214 and the pump units 212 and 213. The base 211 is made in two sections 293 and 294 connected together with screws 295 which may be adjusted to spread the sections apart to tighten the belts 289.

Figure 16:
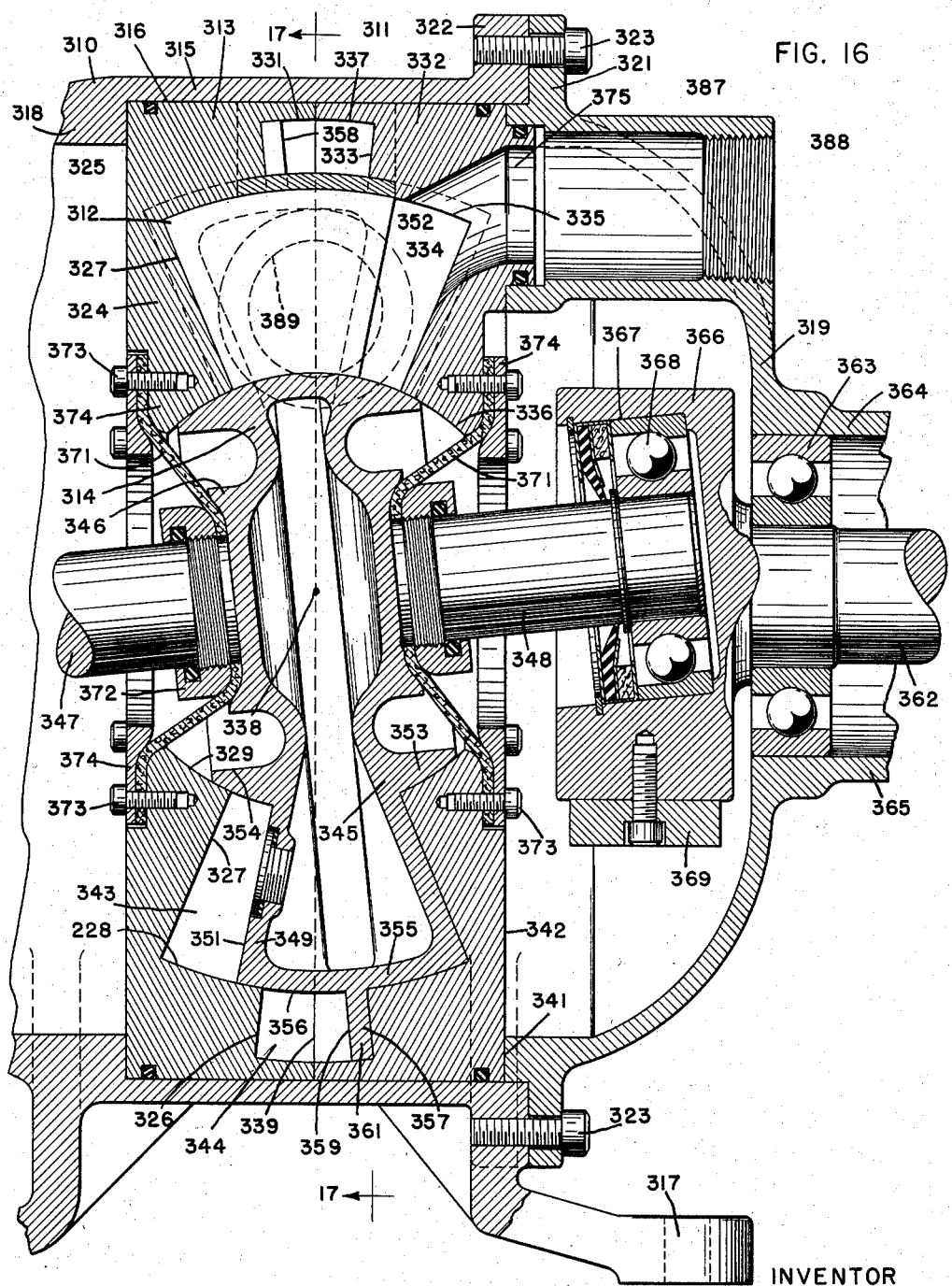
Fig. 16 is a view similar to Fig. 12 of a modification of the structure shown therein.
Figure 17:
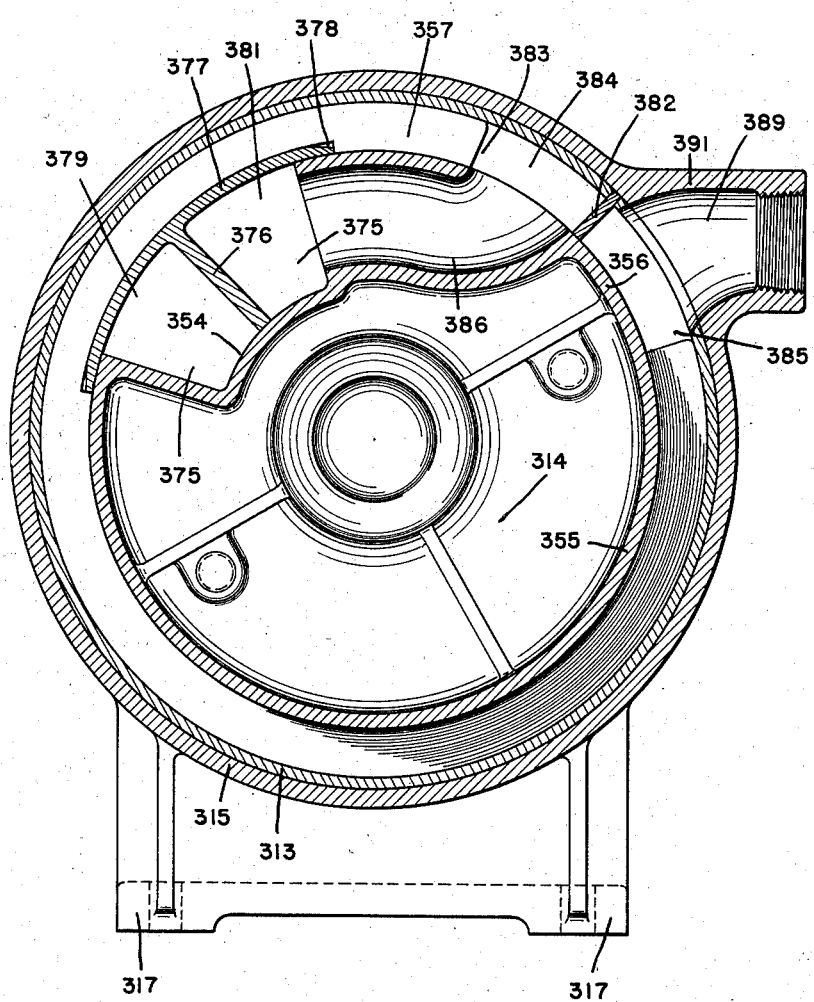
Fig. 17 is a cross-sectional view similar to Fig. 14 and taken on line 17—17 of Fig. 16.

In Figs. 16 and 17 a modification of the form of the invention shown in Figs. 11 to 15 has been illustrated. In this form of the invention, a housing 310 is employed, which is mounted on a suitable base not shown. In this housing is arranged two pump units 311 and 312 which are disposed in coaxial relation and which utilize a single case or stator 313 and a single rotor 314. These units are supported and operated in much the same manner as the construction shown in Figs. 11 to 15 and are driven in the same manner by an electric motor and suitable transmission operated thereby.

The housing 310, as best shown in Fig. 16, consists of a cylindrical shell 315 having a bore 316 therein. Legs 317 extend downwardly from the shell 315 and by means of which the housing may be attached to the base. Issuing outwardly from one side of the housing and integral therewith is an end bell 318, a portion only of which is shown, and which is of the same construction as the end bell 218 of the form of the invention shown in Fig. 11. This end bell carries portions of the rotating parts of the pump. At the other end of the said housing is a detachable bell 319 which similarly supports certain of the rotating parts of the pump. The end bell 319 is formed with a flange 321 which overlies the end of the shell 315 and is secured to a flange 322 formed thereon by means of screws 323.

The two pump units 311 and 312 are formed as a composite structure and utilize the single case 313 previously referred to. This case is received in the bore 316 of the shell 315. This case includes an insert 324 which butts up against a shoulder 325 formed on the end bell 318. This insert has an outer frusto-conical surface 326 and an inner frusto-conical surface 327. These surfaces are connected by a spherical surface 328. Said insert is further formed with a spherical surface 329 at the innermost end of the frusto-conical surface 327 and with another spherical surface 331 at the outer end of the frusto-conical surface 326. Also disposed in the bore 316 of shell 315 is a second insert 332 which has frusto-conical surfaces 333 and 334 which correspond with the surfaces 326 and 327 and lie opposite the same. In addition, insert 332 has spherical surfaces 335, 336 and 337 which lie in continuation of and are concentric with the spherical surfaces 328, 329 and 331. All these surfaces have the same center which is indicated by the reference numeral 338. The two inserts 324 and 332 meet and contact each other along a central plane 339 passing through the center 338.

The two inserts 324 and 332 are held in position by means of the end bell 319 which has shoulders 341 butting up against the outer face 342 of the insert 332. By means of this construction, an inner annular chamber 343 and an outer annular chamber 344 are formed in the case 313.

The two pump units 311 and 342 have a common rotor 314, as previously stated, which includes a single wabble head 345 which has a hub 346. Issuing outwardly from the center of this hub and on opposite sides thereof are two stub shafts 347 and 348 which are integral with said hub. Extending outwardly from the hub is a box-like structure 349 which has two frusto-conical surfaces 351 and 352. The surface 351 lies opposite the frusto-conical surface 327 on insert 324 and is adapted to progressively contact the same as the head 345 nutates. The surface 352 correspondingly engages the surface 334 and the line of contact therebetween progressively rotates as the head operates. Extending outwardly from the head 345 at the inner end of the surfaces 351 and 352 is a flange 353 which has a spherical surface 354. This surface engages the spherical surface 329 of the insert 324. The box-like structure 348 has an outer wall 355 which has a spherical surface 356 adapted to engage the spherical surfaces 228 and 337 of the inserts 324 and 332. Issuing outwardly from the wall 355 is a wabble plate 357 which has two frusto-conical surfaces 358 and 359. The conical surface 358 is adapted to engage the conical surface 333 of the insert 332 while the surface 359 is adapted to engage the surface 326 of the insert 324. The head 345 is preferably made hollow and is cored. The end 361 of the wabble plate 357 is spherical and engages the surfaces 331 and 337 of the inserts 324 and 332.

For rotatably supporting and driving the rotor 314, two shafts 362 are employed which are mounted in the two end bells 318 and 319. These shafts are driven from a single electric motor in the same manner as the shafts 256 and 257 of the form of the invention shown in Fig. 11. For this reason only the shaft mounted in the end bell 19 has been illustrated and which is shown in Fig. 16. This shaft is received in a ball bearing 363 which is pressed into a bore 364 formed in a hub 365 on the end bell 319. The shaft 362 is constructed with an enlargement 366 at the inner end thereof and which is formed with an oblique bore 367 receiving a ball bearing 368. This bearing serves to journal the stub shaft 348. The stub shaft 347 is similarly mounted in corresponding structure carried by the end bell 318. The enlargement 366 has a counter-weight 369 attached to it which helps to balance the device and which causes the pump to operate more smoothly.

To prevent fluid from leaking past the rotor and to prevent lubricant from entering the chambers 343 and 344, two diaphragms 371 are employed. These diaphragms are clamped against the hub 346 of the head 345 by means of nuts 372 screwed on the stub shafts 347 and 348. The said diaphragms are further clamped to the inserts 324 and 332 by means of clamp rings 374 which overlie the outer marginal portions of said diaphragms. Screws 373 pass through these rings and diaphragms and are threaded into the inserts 324 and 332.

The rotor 314 is formed with a cavity or notch 375 which extends from the spherical surface 356 to the surface 354 and throughout a portion of the circumferential extent of the box-like structure 349 as shown in Fig. 17. Mounted in this cavity is a partition 376 carried by an arcuate plate 377. This plate is received in an annular arcuate cavity 378 formed in the two inserts 324 and 332. The partition 376 engages the surface 354 and divides the cavity 375 into an inlet chamber 379 and an outlet chamber 381. In a similar manner, a partition 382 is disposed in a notch 383 formed in the wabble plate 357 and which engages the spherical surface 356 of the wall 355. This partition forms in said notch an inlet chamber 384 and an outlet chamber 385. A passageway 386 in the box-like structure 349 brings the outlet chamber 381 into communication with the inlet chamber 384 of the notch 383. The inlet chamber 379 of the cavity 375 communicates with an inlet passageway 387 formed in a boss 388 on the end bell 319. The outlet chamber 385 of the pump unit 311 communicates with an outlet passageway 389 formed in a boss 391 on the shell 315 of the housing 310.

The operation of all of the forms of the invention is the same as that of the pump shown in Figs. 1 to 6 and will not be repeated. In all of the forms of the invention, the lines of contact of the two pump units do not register with the notches in the wabble plates at the same time. This is procured by having the partitions angularly disposed with reference to one another the lines of contact of the two wabble plates being in register. The same results could of course be procured by having the partitions in register and the lines of contact angularly disposed and out of register.

The advantages of the invention are manifest. Pulsation in the pump is greatly reduced and the pump runs extremely smoothly. Due to the arrangement of parts, blow back through the pump is prevented by one or the other of the units.

Changes in the specific form of the invention, as herein described, may be made within the scope of what is claimed without departing from the spirit of the invention.

Having described the invention, what is claimed as new and desired to be protected by Letters Patent is:

1. In a wabble pump, two wabble pump units each comprising a nutating wabble member, means forming an annular chamber in which said member is disposed and having facing surfaces of revolution, said member having corresponding surfaces for coaction therewith, a partition extending across said chamber, means forming an inlet passageway communicating with said chamber on one side of said partition, means forming an outlet passageway communicating with said chamber on the other side of said partition, said wabble member having a notch therein receiving said partition, means forming a conduit connecting the outlet passageway of one unit with the inlet passageway of the other unit, and means for imparting nutating movement to said wabble members with the angle between a radial plane containing parts of the coacting portions of one wabble member and a radial plane containing a part of the partition thereof differing from that of the other unit throughout the movement of said members to maintain the coacting portions of one member removed from its partition when one of the coacting portions of the other member is at the locality of its partition.

2. In a wabble pump, two wabble pump units each comprising a nutating wabble member, means forming an annular chamber in which said member is disposed and having facing surfaces of revolution, said member having corresponding surfaces for coaction therewith, a partition extending across said chamber, means forming an inlet passageway communicating with said chamber on one side of said partition, means forming an outlet passageway communicating with said chamber on the other side of said partition, said wabble member having a notch therein receiving said partition, means forming a conduit connecting the outlet passageway of one unit with the inlet passageway of the other unit, and means for imparting nutating movement to said wabble members with the angle between a radial plane containing parts of the coacting portions of one wabble member and a radial plane containing a part of the partition thereof differing from that of the other unit throughout the movement of said members by an angle of less than one hundred and eighty degrees to maintain the coacting portions of one member removed from its partition when one of the coacting portions of the other member is at the locality of its partition.

3. In a wabble pump, two wabble pump units each comprising a nutating wabble member, means forming an annular chamber in which said member is disposed and having facing surfaces of revolution, said member having corresponding surfaces for coaction therewith, a drive shaft, a wabble shaft angularly disposed with reference to said drive shaft and supporting said wabble member for nutation, the axes of said shafts lying in a common plane, a partition extending across said chamber and having a portion lying substantially in a plane containing the axis of said drive shaft, means forming an inlet passageway on one side of said partition and an outlet passageway on the other side of said partition, said passageways communicating with said chamber, means forming a conduit connecting the outlet passageway of one unit with the inlet passageway of the other unit, means for simultaneously driving both of said drive shafts with the angles between the planes of said wabble shafts and the planes of said partitions differing from one another by an amount greater than zero degrees and less than one hundred and eighty degrees.

4. In a wabble pump, two wabble pump units each comprising a nutating wabble member, means forming an annular chamber in which said member is disposed and having facing surfaces of revolution, said member having corresponding surfaces for coaction therewith, a drive shaft, a wabble shaft angularly disposed with reference to said drive shaft and supporting said wabble member for nutation, the axes of said shafts lying in a common plane, a partition extending across said chamber and having a portion lying substantially in a plane containing the axis of said drive shaft, means forming an inlet passageway on one side of said partition and an outlet passageway on the other side of said partition, said passageways communicating with said chamber, means forming a conduit connecting the outlet passageway of one unit with the inlet passageway of the other unit, means for simultaneously driving both of said drive shafts with the angles between the planes of said wabble shafts and the planes of said partitions differing from one another by an amount other than zero, one hundred eighty and three hundred sixty degrees.

5. In a wabble pump, two wabble pump units, each consisting of a case having facing frusto-conical surfaces arranged in diverging relation and concentric outer and inner spherical surfaces extending therebetween, said inner spherical surface having an annular opening therethrough, a disc like wabble plate disposed between said surfaces and extending through said opening, one side of said wabble plate lying in close proximity to one of said conical surfaces, the other side of said wabble plate lying in close proximity to the other of said conical surfaces, means moving with said wabble plate and engaging said spherical surfaces, said wabble plate and means forming with said surfaces two annular chambers, a substantially planiform partition extending across said chambers, said plate having a notch therein receiving said partition, means forming an inlet passageway on one side of said partition and an outlet passageway on the other side of said partition, said passageways communicating with said chambers, means forming a conduit connecting the outlet passageway of one unit with the inlet passageway of the other unit and means for imparting nutating movement to said wabble plates with the angle between one line of contact of one of the wabble plates and its partition measured in the direction of nutation differing from that of the corresponding line of contact of the other wabble plate with its partition measured in the same direction to maintain one of said denoted lines of contact of one of said wabble plates removed from its partition while the corresponding denoted line of the other wabble plate is at its partition.

6. In a wabble pump, two wabble pump units each comprising a nutating wabble member, means forming an annular chamber in which said member is disposed and having a portion coacting with said member, means forming adjacent inlet and outlet passageways communicating with said chamber, means for imparting nutating movement to said wabble members with the angle between a radial plane containing a part of the coacting portions of siad first named means and member and a radial plane containing a point of said first named means intermediate said inlet and outlet of one unit differing from that of the other unit to maintain the coacting portions of one unit member removed from the denoted point of said unit while the contacting portions of the other unit are at the locality of said point.

7. In a wabble pump, two wabble pump units each comprising a nutating wabble member, means forming an annular chamber in which said member is disposed and having facing surfaces of revolution, said member having corresponding surfaces for coaction therewith, a partition extending across said chamber, means forming an inlet passageway communicating with said chamber on one side of said partition, means forming an outlet passageway communicating with said chamber on the other side of said partition, said wabble member having a notch therein receiving said partition, means forming a conduit connecting the outlet passageway of one unit with the inlet passageway of the other unit, a wabble shaft supporting said wabble member, a common drive shaft for both of said units, bearings carried by said drive shaft and having their axes angularly disposed with reference to the axis of said drive shaft said bearings receiving and rotatably supporting said wabble shafts and means for driving said drive shaft.

8. In a wabble pump, two wabble pump units each comprising a nutating wabble member, means forming an annular chamber in which said member is disposed and having facing surfaces of revolution, said member having corresponding surfaces for coaction therewith, a partition extending across said chamber, means forming an inlet passageway communicating with said chamber on one side of said partition, means forming an outlet passageway communicating with said chamber on the other side of said partition, said wabble member having a notch therein receiving said partition, means forming a conduit connecting the outlet passageway of one unit with the inlet passageway of the other unit, a wabble shaft supporting said wabble member, a common drive shaft for both of said units, bearings carried by said drive shaft at the ends thereof and having their axes angularly disposed with reference to the axis of said drive shaft said bearings receiving and rotatably supporting said wabble shafts and a motor having a rotor mounted on said drive shaft intermediate the ends thereof.

9. In a wabble pump, two wabble pump units each comprising a nutating wabble member, means forming an annular chamber in which said member is disposed and having facing surfaces of revolution, said members having corresponding surfaces for coaction therewith, a partition extending across said chamber, means forming an inlet passageway communicating with said chamber on one side of said partition, means forming an outlet passageway communicating with said chamber on the other side of said partition, said wabble member having a notch therein receiving said partition, means forming a conduit connecting the outlet passageway of one unit with the inlet passageway of the other unit, a wabble shaft supporting said wabble member, a common drive shaft for both of said units, bearings carried by said drive shaft and having their axes angularly disposed with reference to the axis of said drive shaft, said bearings receiving and rotatably supporting said wabble shafts and the axes of said wabble shafts and drive shaft lying in a common plane, the partitions of said units being out of axial register with respect to each other and means for driving said drive shaft.

10. In a wabble pump, two wabble pump units each comprising a nutating wabble member, means forming an annular chamber in which said member is disposed and having facing surfaces of revolution, said member having corresponding surfaces for coaction therewith, a partition extending across said chamber, means forming an inlet passageway communicating with said chamber on one side of said partition, means forming an outlet passageway communicating with said chamber on the other side of said partition, said wabble member having a slot therein receiving said partition, means forming a conduit connecting the outlet passageway of one unit with the inlet passageway of the other unit, a single wabble shaft carrying both of said wabble members with its axis passing through the center of the surfaces of said first named means, two drive shafts coaxially disposed, the axis of said wabble shaft forming an angle with the axes of the drive shafts and intersecting the same, bearings carried by the facing ends of said drive shafts and rotatably receiving said wabble shaft to procure nutation of said wabble members, said partitions being circumferentially spaced from one another, and means for driving said drive shafts in synchronism.

11. In a wabble pump, two wabble pump units each comprising a nutating wabble member, means forming an annular chamber in which said member is disposed and having facing surfaces of revolutions, said member having corresponding surfaces for coaction therewith, a partition extending across said chamber, means forming an inlet passageway communicating with said chamber on one side of said partition, means forming an outlet passageway communicating with said chamber on the other side of said partition, said wabble member having a slot therein receiving said partition, means forming a conduit connecting the outlet passageway of one unit with the inlet passageway of the other unit, a single wabble shaft carrying both of said wabble members with its axis passing through the center of the surfaces of said first named means, two drive shafts coaxially disposed, the axis of said wabble shaft forming an angle with the axes of the drive shafts and intersecting the same, bearings carried by the facing ends of said drive shafts and rotatably receiving said wabble shaft to procure nutation of said wabble members, a counter shaft parallel to and spaced from said drive shafts and identical transmission means between said counter shaft and each of said drive shafts.

12. In a wabble pump, two wabble pump units disposed in axial juxtaposition and including a case having facing frusto-conical surfaces arranged in diverging relation, a divider in said case having oppositely facing frusto-conical surfaces arranged in converging relation, said case having concentric outer and inner spherical surfaces, said frusto-conical surfaces and said outer spherical surface forming two annular chambers opening inwardly, a rotor having a spherical head movable in proximity to said inner spherical surface and closing said annular chambers, spaced disc like wabble plates issuing from said head and received one in each annular chamber, a single wabble shaft on which said head is mounted, two aligning drive shafts whose axes intersects the axis of said wabble plate and form an angle therewith, bearings carried by the facing ends of said drive shafts and rotatably receiving said wabble shaft to procure nutation of said wabble plates, and means for driving said wabble plates in synchronism.

13. In a wabble pump, two wabble pump units disposed in axial juxtaposition and including a case having facing frusto-conical surfaces arranged in diverging relation, a divider in said case having oppositely facing frusto-conical surfaces arranged in converging relation, said case having concentric outer and inner spherical surfaces, said frusto-conical surfaces and said outer spherical surface forming two annular chambers opening inwardly, a rotor having a spherical head movable in proximity to said inner spherical surface and closing said annular chambers, spaced disc like wabble plates issuing from said head and received one in each annular chamber, a single wabble shaft on which said head is mounted, two aligning drive drafts whose axes intersects the axis of said wabble plate and form an angle therewith, bearings carried by the facing ends of said drive shafts and rotatably receiving said wabble shaft to procure nutation of said wabble plates, means for driving said wabble plates in synchronism, partitions extending across said chambers, means forming an inlet passageway communicating with one of said chambers on one side of the partition therein, means forming an outlet passageway communicating with said chamber on the other side of said partition, means forming similar passageways communicating with the other passageway, said partitions being spaced circumferentially from one another.

14. In a wabble pump, two wabble pump units disposed in axial juxtaposition and including a case having facing frusto-conical surfaces arranged in diverging relation, a divider in said case having oppositely facing frusto-conical surfaces arranged in converging relation, said case having concentric outer and inner spherical surfaces, said outer spherical surface extending between the first named conical surfaces and said inner spherical surface extending outwardly from said denoted conical surfaces, said frusto-conical surfaces and said outer spherical surface forming two annular chambers opening inwardly, a rotor having a spherical head formed with lateral spherical surfaces lying in close proximity to said inner spherical surfaces in said case and an intermediate surface therebetween, said head closing said annular chambers, spaced disc like wabble plates issuing from said head and received one in each annular chamber, said divider lying in close proximity to said intermediate spherical surface, and the ends of said plates lying in close proximity to said first named spherical surface on said case, a single wabble shaft on which said head is mounted, two aligning drive shafts whose axes intersects the axis of said wabble plate and form an angle therewith, bearings carried by the facing ends of said drive shafts and rotatably receiving said wabble shaft to procure nutation of said wabble plates, means for driving said wabble plates in synchronism, partitions extending across said chambers, means forming an inlet passageway communicating with one of said chambers on one side of the partition therein, means forming an outlet passageway communicating with said chamber on the other side of said partition, means forming similar passageways communicating with the other chambers, said partitions being spaced circumferentially from one another.

15. In a wabble pump, a housing comprising a shell open at its ends, a motor mounted in said shell and having a drive shaft, end bells attached to said shell, bearings in said end bells, for supporting said shaft for rotation, a wabble pump unit received within each of said end bells and comprising a nutating wabble member, means carried by said end bell and forming an annular chamber in which said member is disposed and having facing frusto-conical surfaces, said member having corresponding surfaces for coaction therewith, a partition extending across said chamber, means forming an inlet passageway communicating with said chamber on one side of said partition, means forming an outlet passageway communicating with said chamber on the other side of said partition, said wabble member having a notch receiving said partition, means mounted at the ends of said drive shaft and supporting said wabble members for nutating movement, said partitions and the axes of said wabble members being arranged so that the angle between a plane radial with respect to the drive shaft and containing a point on the axis of one of the wabble members and a similar radial plane containing a point of the corresponding partition differs from the angle between radial planes containing similar points of the other pump unit.

16. In a wabble pump having two pump units, a housing, means carried by said housing and forming radially disposed inner and outer concentric annular chambers each having facing surfaces of revolution, a rotor disposed within said housing having radially disposed inner and outer annular wabble members concentric with one another and received within said annular chambers and engaging said surfaces, partitions extending across said chambers, said wabble plate having notches therein receiving said partition, said partitions being circumferentially spaced from one another, means forming inlet and outlet passageways communicating with said chambers on opposite sides of said partitions, the outlet passageway of one pump unit being connected to the inlet passageway of the other unit and means for supporting and giving to said members nutating movement relative to the surfaces of siad chambers.

17. In a wabble pump having two pump units, a housing, means carried by said housing and forming radially disposed inner and outer concentric annular chambers each having facing frusto-conical surfaces, said outer chamber having a spherical surface connecting the outer ends of its frusto-conical surfaces, means forming a spherical groove between said chambers having concentric spherical surfaces, means forming concentric spherical surfaces at the inner ends of the conical surfaces of said inner chamber, a rotor disposed within said housing having radially disposed inner and outer annular wabble plates concentric with one another and received within said annular chambers and engaging said frusto-conical surfaces, the end of said outer wabble plate engaging said first named spherical surface, spherical wings on said rotor disposed between said wabble plates and received with and engaging the spherical surfaces of said groove, said rotor having spherical surfaces at the inner end of said inner wabble plate engaging the last named spherical surfaces of said inner chamber, partitions extending across said chambers, said wabble plate having notches therein receiving said partition, said partitions being circumferentially spaced from one another, means forming inlet and outlet passageways communicating with said chambers on opposite sides of said partitions, the outlet passageway of one pump unit being connected to the inlet passageway of the other unit and means for supporting and giving to said plates nutating movement relative to the frusto-conical surfaces of said chambers.

18. In a wabble pump having two pump units, a housing, means carried by said housing and forming radially disposed inner and outer concentric annular chambers each having facing frusto-conical surfaces, said outer chamber having a spherical surface connecting the outer ends of its frusto-conical surfaces, said inner annular chamber being of a greater width than said outer chamber to form shoulders therebetween spherical in form, means forming at the innermost portions of said inner chamber spherical shoulders, a rotor disposed within said housing having radially disposed inner and outer annular wabble plates concentric with one another, and received within said annular chambers and engaging said frusto-conical surfaces, the end of said outer wabble plate engaging said first named spherical surface, said inner wabble plate being of greater width than said outer wabble plate to correspond with said inner chamber and being provided with shoulders extending up to said outer wabble plate and engaging the first named shoulders of said outer unit, said rotor having spherical surfaces at the inner end of said inner wabble plate and engaging the last named spherical surfaces of said inner chamber, partitions extending across said chambers, said wabble plate having notches therein receiving said partitions, said partitions being circumferentially spaced from one another, means forming inlet and outlet passageways communicating with said chambers on opposite sides of said partition, the outlet passageway of one pump unit being connected to the inlet passageway of the other unit and means for supporting and giving to said plates nutating movement relative to the frusto-conical surfaces of said chambers.

19. In a wabble pump, two wabble units each comprising a nutating wabble member, means forming an annular chamber in which said wabble member is disposed and having facing surfaces of revolution said member having corresponding surfaces adapted to progressively contact the first named surfaces as the member nutates, a partition extending across said chamber, said wabble member having a notch therein receiving said partition, means forming an inlet passageway communicating with said chamber on one side of said partition, means forming an outlet passageway communicating with said chamber on the other side of said partition, means forming a conduit connecting the outlet chamber of one unit with the inlet chamber of the other unit, means for simultaneously driving both of said members, said members and partition being so arranged that when the contacting portions of one unit is in proximity to the partition thereof, the conacting portions of the other unit is removed therefrom.

20. In a wabble pump, two wabble units, each comprising a drive shaft, and a nutating wabble member whose axis intersects the axis of the drive shaft, said member being driven by said drive shaft, means forming an annular chamber in which said member is disposed and having facing surfaces of revolution, said member having corresponding surfaces for coaction therewith, a partition extending across said chamber, means forming an inlet passageway communicating with said chamber on one side of said partition, means forming an outlet passageway communicating with said chamber on the other side of said partition, said wabble member having a notch therein receiving said partition, means for driving said wabble members in unison, means forming a conduit connecting the outlet passageway of one unit with the inlet passageway of the other unit, said partitions and wabble members being arranged so that the angle between a plane containing the axes of the drive shaft and the wabble member of one unit and a plane containing the drive shaft and a point in the partition of said unit differs from the angle between the plane containing the axes of the drive shaft and wabble member of the other unit and a plane containing the axes of the drive shaft and a corresponding point in the partition of said second named unit.

21. The wabble pump of claim 20 in which the axes of the drive shafts and of the wabble members of both units lie in a common plane.

22. The wabble pump of claim 20 in which the drive shafts of the two units are connected together and operate in unison.

23. The wabble pump of claim 21 in which the planes containing the axes of the drive shafts and the denoted points of the partitions make an angle with one another of less than 180 degrees and greater than zero degrees.

24. The wabble pump of claim 20 in which an electric motor is employed to drive the drive shafts and whose armature is mounted between said units.

25. The wabble pump of claim 20 in which the wabble members are connected together and nutate in unison and in which the drive shafts are separate and simultaneously driven by separate transmission means for each drive shaft from a single transmission member.

References Cited in the file of this patent

UNITED STATES PATENTS

| | | |
|---|---|---|
| 552,590 | Shaw | Jan. 7, 1896 |
| 1,833,501 | Schick | Nov. 24, 1931 |
| 2,000,629 | Wicha | May 7, 1935 |
| 2,015,826 | Vincent | Oct. 1, 1935 |
| 2,693,764 | Cornelius | Nov. 9, 1954 |